US007869590B2

(12) United States Patent (10) Patent No.: US 7,869,590 B2
Surendran et al. (45) Date of Patent: Jan. 11, 2011

(54) METHOD AND SYSTEM FOR HARDWARE ACCELERATOR FOR IMPLEMENTING F9 INTEGRITY ALGORITHM IN WCDMA COMPLIANT HANDSETS

(75) Inventors: Srinivasan Surendran, San Diego, CA (US); Ruei-Shiang Suen, Dublin, CA (US)

(73) Assignee: Broadcom Corporation, Irvine, CA (US)

( * ) Notice: Subject to any disclaimer, the term of this patent is extended or adjusted under 35 U.S.C. 154(b) by 1621 days.

(21) Appl. No.: 11/103,705

(22) Filed: Apr. 12, 2005

(65) Prior Publication Data

US 2006/0230274 A1 Oct. 12, 2006

(51) Int. Cl.
*H04K 1/00* (2006.01)
*H04L 9/00* (2006.01)
*H04L 9/28* (2006.01)

(52) U.S. Cl. .............................. 380/28; 380/44; 380/37; 380/268; 713/176

(58) Field of Classification Search ................. 713/176; 380/37, 44, 28, 30, 268
See application file for complete search history.

(56) References Cited

U.S. PATENT DOCUMENTS

| 5,231,668 | A  | * | 7/1993  | Kravitz ........................ 380/28 |
| 5,680,550 | A  | * | 10/1997 | Kuszmaul et al. ............. 712/11 |
| 6,108,459 | A  | * | 8/2000  | Tsuji et al. ................... 382/300 |
| 6,205,564 | B1 | * | 3/2001  | Kim et al. ...................... 714/48 |
| 6,889,323 | B2 | * | 5/2005  | Sugahara et al. ............ 713/170 |
| 7,046,992 | B2 | * | 5/2006  | Wallentin et al. ............ 455/411 |
| 7,212,631 | B2 | * | 5/2007  | Averbuj et al. ................ 380/37 |
| 7,333,609 | B2 | * | 2/2008  | Kasuya et al. ................ 380/46 |
| 7,447,311 | B2 | * | 11/2008 | Heo et al. ..................... 380/30 |
| 7,471,795 | B2 | * | 12/2008 | Higurashi ................... 380/274 |
| 7,471,943 | B2 | * | 12/2008 | Chun et al. ................. 455/410 |
| 2002/0174332 | A1 | * | 11/2002 | Vialen et al. ................ 713/152 |
| 2002/0186841 | A1 | * | 12/2002 | Averbuj et al. ................ 380/44 |
| 2003/0003895 | A1 | * | 1/2003  | Wallentin et al. ........... 455/410 |

(Continued)

OTHER PUBLICATIONS

3$^{rd}$ Generation Partnership Project, "3GPP, Technical Specification Group Services and System Aspects, 3G Security, Specification of the 3GPP Confidentiality and Integrity Algorithms, Document 1: f 8 and f 9 Specification (release 5)", 3GPP TS 35.201 v 5.0.0 Jun. 2002, pp. 1-22.

(Continued)

*Primary Examiner*—David Garcia Cervetti
(74) *Attorney, Agent, or Firm*—McAndrews, Held & Malloy, Ltd.

(57) ABSTRACT

In a wireless communication system, a method and system for a hardware accelerator for implementing the f9 integrity algorithm in WCDMA compliant handsets are provided. Intermediate variables may be initialized in an integrity function and a first processing block of bits and at least one additional processing block of bits may be generated for the integrity function from a padded string generated from input variables. Values for a first and a second processing variable may be generated for each processing stage based on a corresponding processing block of bits and on immediately generated previous first and second processing values. The first processing value may be generated utilizing a KASUMI operation after an indication that an immediately previous generated first processing value is available. An authentication code may be generated based on a last of the second processing values and a modified integrity key.

24 Claims, 8 Drawing Sheets

U.S. PATENT DOCUMENTS

| | | | |
|---|---|---|---|
| 2003/0007636 A1* | 1/2003 | Alves et al. | 380/37 |
| 2003/0061547 A1* | 3/2003 | Bartling | 714/43 |
| 2003/0100291 A1* | 5/2003 | Krishnarajah et al. | 455/410 |
| 2003/0211857 A1* | 11/2003 | Afshartous et al. | 455/502 |
| 2004/0071290 A1* | 4/2004 | Lim | 380/37 |
| 2004/0131180 A1* | 7/2004 | Mazuz et al. | 380/37 |
| 2004/0131186 A1* | 7/2004 | Kasuya et al. | 380/255 |
| 2004/0162055 A1* | 8/2004 | Wu | 455/410 |
| 2004/0162065 A1* | 8/2004 | Chun et al. | 455/422.1 |
| 2004/0228491 A1* | 11/2004 | Wu | 380/272 |
| 2004/0242195 A1* | 12/2004 | Chun et al. | 455/410 |
| 2005/0033960 A1* | 2/2005 | Vialen et al. | 713/170 |
| 2005/0038113 A1* | 2/2005 | Groner et al. | 514/546 |
| 2005/0058293 A1* | 3/2005 | Higurashi | 380/274 |
| 2005/0228980 A1* | 10/2005 | Brokish et al. | 713/2 |
| 2005/0238166 A1* | 10/2005 | Koshy et al. | 380/28 |
| 2005/0262344 A1* | 11/2005 | Hepler et al. | 713/168 |
| 2005/0268092 A1* | 12/2005 | Shankar et al. | 713/164 |
| 2006/0056620 A1* | 3/2006 | Shingal et al. | 380/28 |
| 2006/0129848 A1* | 6/2006 | Paksoy et al. | 713/193 |
| 2006/0177050 A1* | 8/2006 | Surendran et al. | 380/28 |
| 2006/0230274 A1* | 10/2006 | Surendran et al. | 713/176 |
| 2006/0294361 A1* | 12/2006 | Matusz et al. | 713/151 |
| 2007/0155339 A1* | 7/2007 | Jiang | 455/73 |
| 2007/0189523 A1* | 8/2007 | Zhou et al. | 380/37 |
| 2007/0201424 A1* | 8/2007 | Kobayashi et al. | 370/349 |
| 2007/0297367 A1* | 12/2007 | Wang et al. | 370/331 |
| 2008/0192925 A1* | 8/2008 | Sachs et al. | 380/29 |
| 2008/0205366 A1* | 8/2008 | Wang et al. | 370/342 |
| 2009/0034718 A1* | 2/2009 | Lin | 380/29 |

OTHER PUBLICATIONS

3$^{rd}$ Generation Partnership Project, "3GPP, Technical Specification Group Services and System Aspects, 3G Security, Specification of the 3GPP Confidentiality and Integrity Algorithms, Document 2: KASUMI Specification (Release 5)", 3GPP TS 35.202 v 5.0.0 Jun. 2002, pp. 1-24.

* cited by examiner

METHOD AND SYSTEM FOR HARDWARE ACCELERATOR FOR IMPLEMENTING F9 INTEGRITY ALGORITHM IN WCDMA COMPLIANT HANDSETS

CROSS-REFERENCE TO RELATED APPLICATIONS/INCORPORATION BY REFERENCE

This application makes reference to:
U.S. patent application Ser. No. 10/924,002 filed Aug. 23, 2004;
U.S. patent application Ser. No. 10/923,954 filed Aug. 23, 2004;
U.S. patent application Ser. No. 10/924,219 filed Aug. 23, 2004;
U.S. patent application Ser. No. 10/924,214 filed Aug. 23, 2004;
U.S. patent application Ser. No. 10/924,177 filed Aug. 23, 2004; and
U.S. patent application Ser. No. 11/053,099 filed Feb. 8, 2005.

The above stated applications are hereby incorporated herein by reference in their entirety.

FIELD OF THE INVENTION

Certain embodiments of the invention relate to cryptography. More specifically, certain embodiments of the invention relate to a method and system for a hardware accelerator for implementing an f9 integrity algorithm in WCDMA compliant handsets.

BACKGROUND OF THE INVENTION

In wireless communication systems, the ability to provide secure, confidential transmissions and the ability to verify the integrity of the transmissions become highly important tasks as these systems move towards next generation voice and data services. Secure wireless transmissions may be achieved by applying confidentiality and integrity algorithms to encrypt and authenticate the information to be transmitted. For example, the 3rd Generation Partnership Project (3GPP) provides standardized specifications for an f8 confidentiality algorithm and for an f9 integrity algorithm for wireless applications (3GPP, Technical Specification Group Services and System Aspects, 3G Security, Specification of the 3GPP Confidentiality and Integrity Algorithms, Document 1, f8 and f9 Specifications, Release 5-3GPP TS 35.201 V5.0.0, 2002-06).

The f8 confidentiality algorithm and the f9 integrity algorithm are both based on the KASUMI algorithm. The f8 confidentiality algorithm or confidentiality function is a stream cipher, that is, it is a block cipher with a block length of one, which may be used to encrypt/decrypt blocks under a confidentiality key, CK. The block of data may be between 1 and 20000 bits long, for example. The f8 confidentiality algorithm may use the KASUMI algorithm in an output feedback mode (OFB) to operate as a key stream generator. The f9 integrity algorithm or integrity function may be utilized to generate a 32-bit message authentication code (MAC) for a given message using an integrity key (IK). The f9 integrity algorithm may be utilized to generate an authentication code that ensures the integrity of signaling data or signaling messages in Wideband Code Division Multiple Access (WCDMA) applications, for example. The f9 algorithm may utilize the KASUMI algorithm in cipher block chaining message authentication code (CBC-MAC) mode.

The KASUMI algorithm is a symmetric block cipher with a Feistel structure or Feistel network, which produces a 64-bit output from a 64-bit input under the control of a 128-bit key (3GPP, Technical Specification Group Services and System Aspects, 3G Security, Specification of the 3GPP Confidentiality and Integrity Algorithms, Document 2, KASUMI Specification, Release 5-3GPP TS 35.302 V5.0.0, 2002-06). Feistel networks and similar constructions are product ciphers and may combine multiple rounds of repeated operations, for example, bit-shuffling functions, simple non-linear functions, and/or linear mixing operations. The bit-shuffling functions may be performed by permutation boxes or P-boxes. The simple non-linear functions may be performed by substitution boxes or S-boxes. The linear mixing may be performed using XOR operations.

Implementing the f9 integrity algorithm to authenticate messages may require ciphering architectures that provide fast and efficient execution in order to meet the transmission rates, size and cost constraints required by next generation voice and data services, and mobile systems. Because of its complexity, implementing the f9 integrity algorithm in embedded software that may be executed by a general-purpose processor utilized in a system-on-chip (SOC) or by a digital signal processor (DSP), may not provide the speed or efficiency necessary for fast secure transmissions in a wireless communication network. Moreover, these processors may need to share some of their processing or computing capacity with other applications needed for data processing and/or transmission, further limiting processing resources available for authentication applications. The development of cost effective integrated circuits (IC) capable of accelerating the speed with which authentication may be achieved by the f9 integrity algorithm is necessary for the deployment next generation voice and data services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method implementing an f9 integrity algorithm in WCDMA compliant handsets, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a hardware accelerator for implementing an f9 integrity algorithm in WCDMA compliant handsets. Intermediate variables may be initialized in an integrity function and a first processing block of bits and at least one additional processing block of bits may be generated for the integrity function from a padded string generated from input variables. Values for a first and a second processing variable may be generated for each processing stage based on a corresponding processing block of bits and on immediately generated previous first and second processing values. The first processing value may be generated utilizing a KASUMI operation after an indication that an immediately generated previous first processing value is available. An authentication code may be generated based on a last of second processing values and a modified integrity key. This approach may provide a cost effective integrated circuit (IC) solution capable of accelerating the generation of message authentication codes for data integrity that may facilitate for a faster deployment of next generation data services.

Figure 1A:
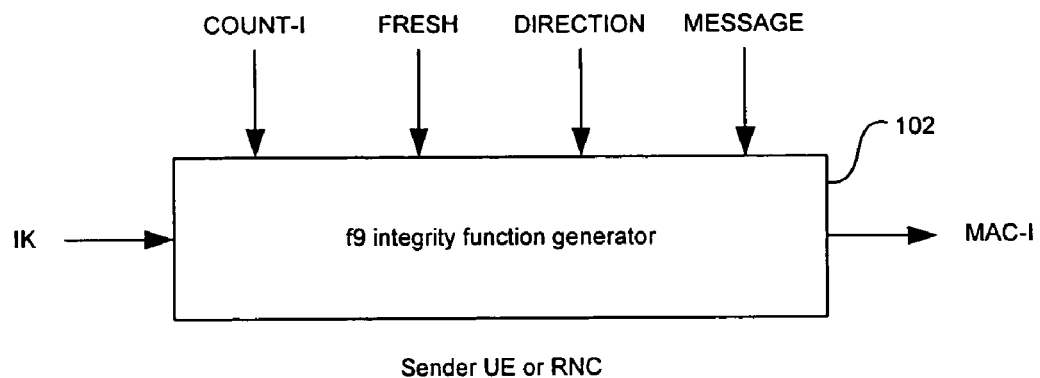
FIGS. 1A-1B illustrate a block diagram of an exemplary f9 integrity function generator for WCDMA communications, as disclosed in 3rd Generation Partnership Project, Technical Specification Group Services and System Aspects, 3G Security, Specification of the 3GPP Confidentiality and Integrity Algorithms, Document 1, f8 and f9 Specifications, Release 5 (3GPP TS 35.201 V5.0.0, 2002-06).
Figure 1B:
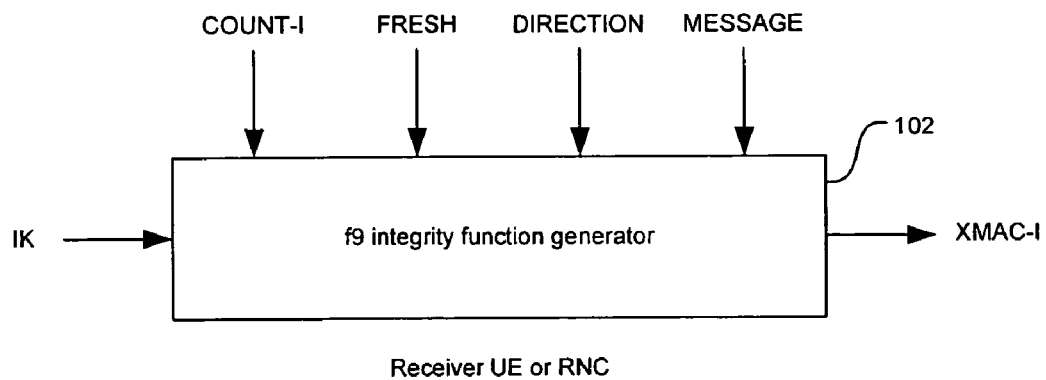

FIGS. 1A-1B illustrate a block diagram of an exemplary f9 integrity function generator for WCDMA communications, as disclosed in 3rd Generation Partnership Project, Technical Specification Group Services and System Aspects, 3G Security, Specification of the 3GPP Confidentiality and Integrity Algorithms, Document 1, f8 and f9 Specifications, Release 5 (3GPP TS 35.201 V5.0.0, 2002-06). Referring to FIG. 1A, there is shown an f9 integrity function generator 102 that comprises suitable logic, circuitry, and/or code that may be adapted to generate a 32-bit message authentication code for data integrity from a plurality of inputs by utilizing the f9 integrity function. The plurality of inputs may comprise a 32-bit frame dependent input, COUNT-I, a 32-bit random number, FRESH, a direction of transmission bit, DIRECTION, an input stream, MESSAGE, and a 128-bit integrity key, IK. The input stream, MESSAGE, may correspond to signaling data and may comprise a number of bits, LENGTH, where LENGTH$\leq 19^2$. The value of the message authentication code may be appended to the input stream when the input stream is sent over a radio access link, for example.

The f9 integrity function generator 102 may be utilized in applications that may require the generation of an authentication code, MAC-I, for verifying the integrity of signaling data that may be utilized when a user equipment (UE), such as a mobile phone, transmits to a base station (BS) via a physical layer, for example. Moreover, the f9 integrity function generator 102 may also be utilized in applications that may require the generation of an authentication code when a radio network controller (RNC) transmits to a set of base stations via a physical layer, for example. An RNC may generally be adapted to control a set of base stations and may also be adapted to control other radio resources, for example. The UE or the RNC may generate the authentication code that is appended to the signaling data transmitted to a BS.

Referring to FIG. 1B, the f9 integrity function generator 102 in FIG. 1A may also be adapted to generate a 32-bit message authentication code, XMAC-I, for verifying the integrity of signaling data that may be utilized when a BS transmits to a UE via a physical layer, for example. Moreover, the f9 integrity function generator 102 may also be utilized in applications that may require the generation of an authentication code when a BS transmits signaling data to an RNC via a physical layer, for example. In this regard, a receiver, whether a UE or an RNC, may generate the authentication code that is appended to the signaling data transmitted to a BS.

Figure 2:
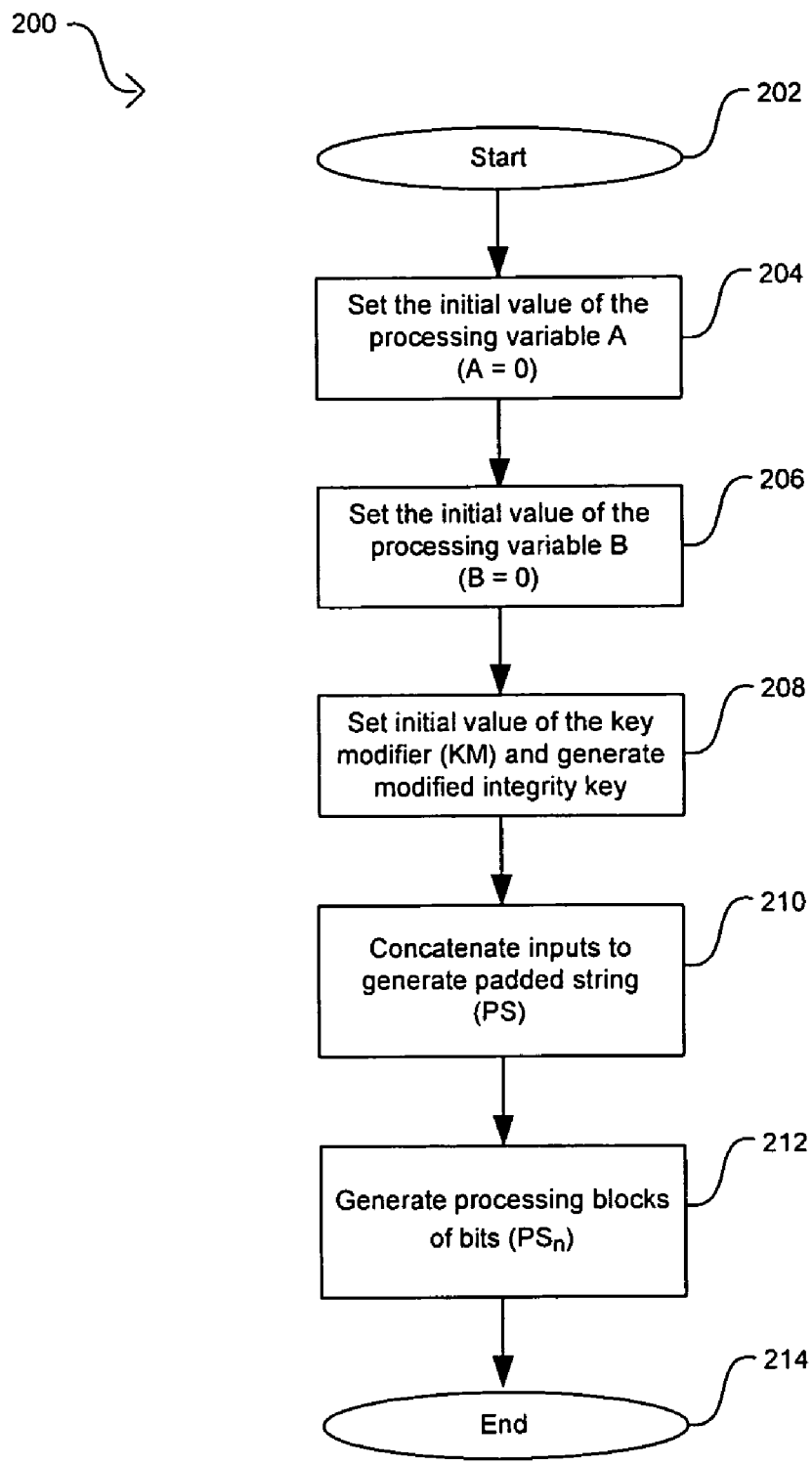
FIG. 2 is a flow diagram that illustrates exemplary steps for the initialization of the f9 integrity function, which may be utilized in connection with an embodiment of the invention.

FIG. 2 is a flow diagram that illustrates exemplary steps for the initialization of the f9 integrity function, which may be utilized in connection with an embodiment of the invention. Referring to FIG. 2, after start step 202, in step 204, a first processing or working variable, A, is set to an initial value of zero, A=0. In step 206, a second processing or working variable, B, is set to an initial value of zero, B=0. In step 208, a key modifier, KM, which may be utilized to modify the integrity key, IK, may be set to an initial value of KM=0xAAAAAAAAAAAAAAAAAAAAAAAAAAAAAAAA4 AAAA. A modified integrity key may be generated by XOR-ing the integrity key, IK, with the key modifier, KM, that is, by performing the operation IK⊕KM.

In step 210, a padded string, PS, may be generated by concatenating the input variables COUNT-I, FRESH, MESSAGE, and DIRECTION, and by appending to the least significant bit (LSB) of the concatenated input variables a logic 1 bit followed by a number of logic 0 bits that results in a total number of bits for the padded string, PS, that is an integral multiple of 64 bits. The padded string, PS, may be represented as follows:

$PS = COUNT \| FRESH \| MESSAGE \| DIRECTION \| 1 \| 0^*$, $= COUNT[0] \ldots COUNT[31] FRESH[0] \ldots FRESH[31]$ $MESSAGE[0] \ldots$ $MESSAGE[LENGTH - 1] DIRECTION[0] 10^*$, where the function $\|$ corresponds to a concatenation operation and the asterisk indicates that the number of logic 0 bits appended to the right of the logic 1 bit may range from 0 to 63.

In step 212, the padded string, PS, may be split into a plurality of processing blocks of bits where each processing block of bits comprises 64 bits. A parameter, BLOCKS, may be utilized to represent the number of processing blocks of bits that may be generated from the padded string, PS. Each processing block of bits may be represented by a processing block parameter, $PS_n$, where n is a block count integer in the range $0 \leq n \leq (BLOCKS-1)$ that indicates the $n^{th}$ processing stage in the f9 integrity function. In this regard, the padded string may be expressed as follows:

$PS = PS_0 \| PS_1 \| PS_2 \| \ldots \| PS_{BLOCKS-1}$, where the function || corresponds to a concatenation operation and $PS_0$ through $PS_{BLOCKS-1}$ correspond to the processing block parameters that represent the processing block of bits. After step 212 is completed, the flow diagram 200 may proceed to end step 214.

Figure 3A:
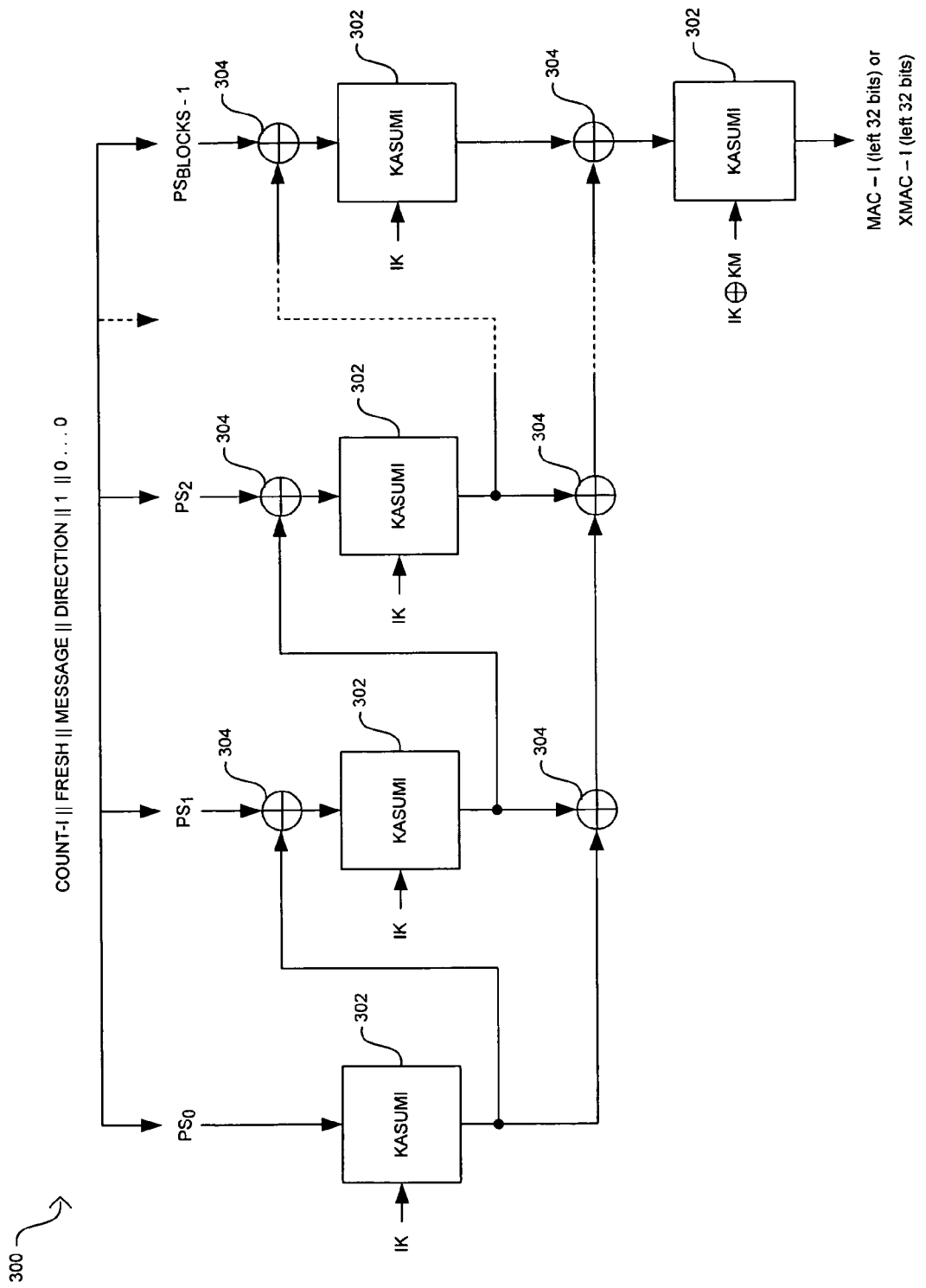
FIG. 3A is a diagram of an exemplary f9 integrity function, which may be utilized in connection with an embodiment of the invention.

FIG. 3A is a diagram of an exemplary f9 integrity function, which may be utilized in connection with an embodiment of the invention. Referring to FIG. 3A, there is shown a plurality of KASUMI operations 302 and a plurality of XOR operations 304. The KASUMI operation 302 may comprise suitable logic, circuitry, and/or code that may be adapted to perform a KASUMI algorithm, which is a symmetric block cipher that produces a 64-bit output from a 64-bit input under the control of an integrity key. U.S. patent application Ser. No. 10/924,002 filed on Aug. 23, 2004 entitled "Method and System for Implementing KASUMI Algorithm for Accelerating Cryptography in GSM/GPRS/EDGE Compliant Handsets," discloses exemplary KASUMI algorithm implementations that may be utilized in connection with the present invention. Accordingly, U.S. patent application Ser. No. 10/924,002 is hereby incorporated herein by reference in its entirety. The XOR operation 304 may comprise suitable logic, circuitry, and/or code that may be adapted to perform a bit-wise XOR operation on two 64-bit inputs to produce a 64-bit output.

In operation, a value may be generated for the first processing variable A and for the second processing variable B at each processing stage in the f9 integrity function. In this regard, a new value may be generated for the first processing variable A by utilizing the expression $A=KASUMI[A \oplus PS_n]_{IK}$, where $PS_n$ corresponds to the processing block parameter that represents the processing block of bits for the $n^{th}$ processing stage. Moreover, the KASUMI algorithm may be performed by a KASUMI operation 302 utilizing an immediately generated previous value of the first processing variable A and the integrity key, IK, and the $\oplus$ function may be performed by an XOR operation 304. During a first processing stage, that is, when n=0, the immediately generated previous value of the first processing variable A is the initialized value, A=0. For subsequent processing stages, an immediately generated previous value of the first processing variable A may correspond to the value of the first processing variable A generated for the immediately previous processing stage.

Similarly, a new value may be generated for the second processing variable B at each processing stage in the f9 integrity function. In this regard, the new value may be generated for the second processing variable B by utilizing the expression $B=B \oplus A$, where the $\oplus$ function may be performed by an XOR operation 304 and the value of the first processing variable A corresponds to the new value generated for the current processing stage.

After a last processing stage is completed and a last value has been generated for the first processing variable A and for the second processing variable B, the authentication code MAC-I or XMAC-I may be generated by modifying the last value of the second processing variable B as described by the expression $B=KASUMI[B]_{IK \oplus KM}$, where the KASUMI algorithm may be performed by a KASUMI operation 302 and $IK \oplus KM$ corresponds to the modified integrity key. The 32-bit MAC-I or XMAC-I authentication code may comprise the 32 least significant bits (LSBs) of the modified last value of the second processing variable B as described by the expressions MAC-I[i]=B[i] and XMAC-I[i]=B[i], where $0 \leq i \leq 31$. In this regard, the 32 most significant bits (MSBs) B[32] through B[63] may be discarded.

Figure 3B:
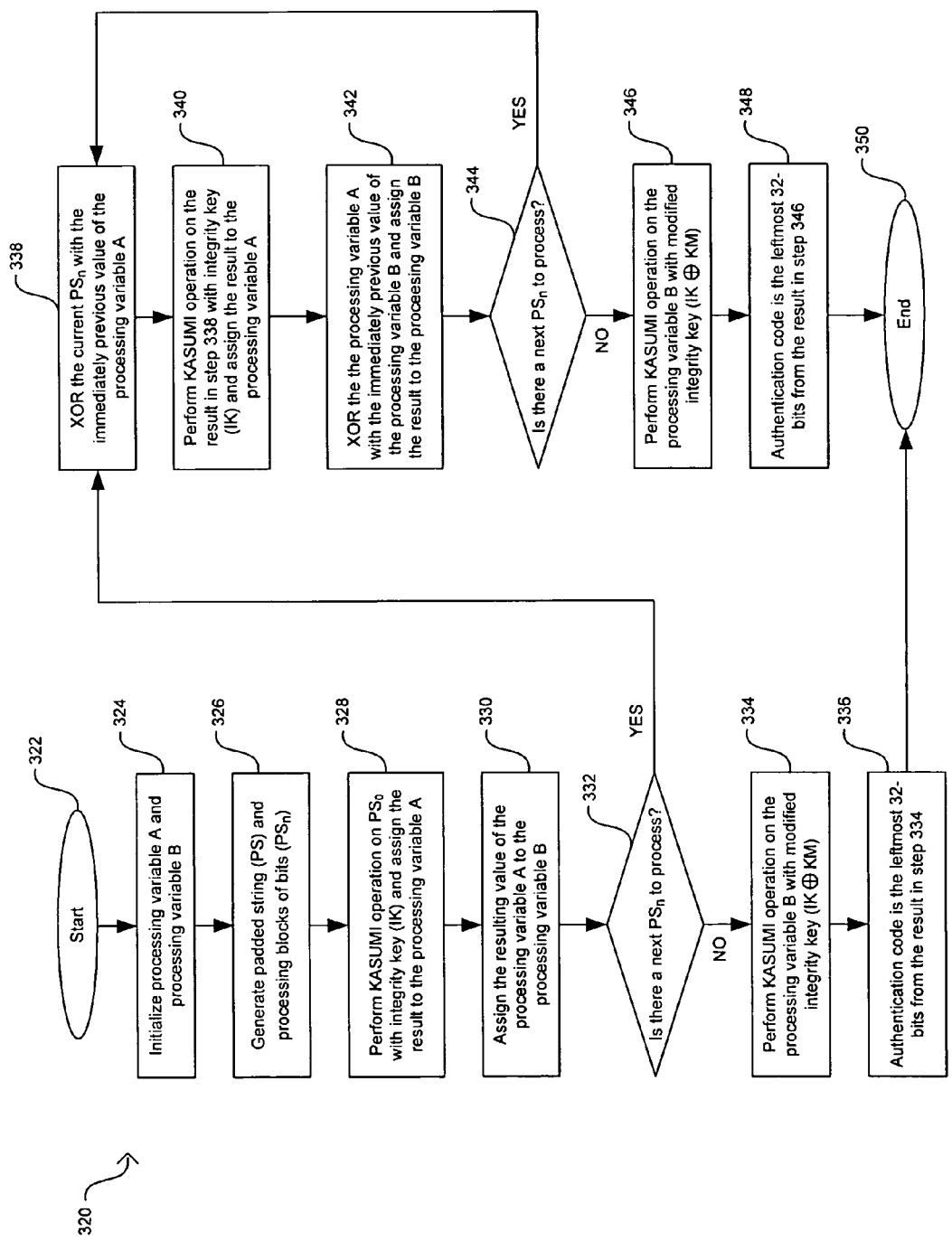
FIG. 3B is a flow diagram that illustrates exemplary steps in the operation of the f9 integrity function, which may be utilized in connection with an embodiment of the invention.

FIG. 3B is a flow diagram that illustrates exemplary steps in the operation of the f9 integrity function, which may be utilized in connection with an embodiment of the invention. Referring to FIG. 3B, after start step 322, in step 324, the processing variable A and the processing variable B may be initialized as described in FIG. 2. In step 326, the padded string, PS, and the processing blocks of bits represented by $PS_0$ through $PS_{BLOCKS-1}$ may be generated as described in FIG. 2.

In step 328, during the first processing stage, the expression $A=KASUMI[A \oplus PS_n]_{IK}$ may be determined by first performing the KASUMI algorithm on the result of XORing the first processing block of bits represented by $PS_0$ with the initialized value of the processing variable A. The input to the KASUMI algorithm during the first processing state may be referred to as a first processing input. In this regard, the KASUMI algorithm may be performed by a KASUMI operation 302 as described in FIG. 3A, for example, by utilizing the integrity key, IK. The result of the KASUMI algorithm may be assigned or passed to the current value of the processing variable A.

In step 330, during the first processing stage, the expression $B=B \oplus A$ may be determined by performing a XORing operation of the initialized value of the processing variable B with the current value of the processing variable A determined in step 328. In this regard, the XORing operation may be performed by a XOR operation 304 as described in FIG. 3A, for example. The result of the XORing operation may be assigned or passed to the current value of the processing variable B.

In step 332, the f9 integrity function may determine whether additional processing blocks of bits need to be processed in order to generate an authentication code. In this regard, the parameter, BLOCKS, that represents the number of processing blocks of bits that may be generated from the padded string, PS, and the block count integer, n, may be utilized to determine whether additional processing blocks of bits need to be processed. When additional processing blocks of bits need not be processed, the flow diagram 320 may proceed to step 334. In step 334, performing the KASUMI algorithm may be utilized to modify the current value of the processing variable B. In this regard, the KASUMI algorithm may be performed on the current value of the processing variable B by a KASUMI operation 302 as described in FIG. 3A, for example, by utilizing the modified integrity key, $IK \oplus KM$. In step 336, the authentication code may be generated based on the leftmost 32 bits of the modified current value of the processing variable B generated in step 334. After step 336, the flow diagram 320 may proceed to end step 350.

Returning to step 332, when additional processing blocks of bits need to be processed in order to generate an authentication code, the flow diagram 320 may proceed to step 338. In step 338, the current processing block of bits represented by PSn may be XORed with the immediately generated previous value of the processing variable A to generate a current processing input for the current processing stage. For example, for the second processing stage, when n=1, the immediately generated previous value of the processing variable A may be the value generated in step 328. In another example, for the last processing stage, that is, when n=(BLOCKS-1), the immediately generated previous value of the processing variable A may be the value of the processing variable A generated or determined in the next to last processing stage, that is, when n=(BLOCKS-2).

In step 340, the KASUMI algorithm may be performed on the current processing input generated in step 338. In this regard, the KASUMI algorithm may be performed by a KASUMI operation 302 as described in FIG. 3A, for example, by utilizing the integrity key, IK. The result of the KASUMI algorithm may be assigned to the current value of the processing variable A in accordance with the expression A=KASUMI $[A \oplus PS_n]_{IK}$. In step 342, the current value of the processing variable A may be XORed with the immediately generated previous value of the processing variable B to generate a current value of the processing variable B in accordance with the expression B=B $\oplus$ A.

In step 344, the f9 integrity function may determine whether additional processing blocks of bits need to be processed in order to generate an authentication code. In this regard, the parameter, BLOCKS, that represents the number of processing blocks of bits that may be generated from the padded string, PS, and the block count integer, n, may be utilized to determine whether additional processing blocks of bit need to be processed. When additional processing blocks of bits need to be processed, the flow diagram 320 may proceed to step 338. When additional processing blocks of bit need not be processed, the flow diagram 320 may proceed to step 346.

In step 346, performing the KASUMI algorithm may be utilized to modify the current value of the processing variable B. In this regard, the KASUMI algorithm may be performed on the current value of the processing variable B by a KASUMI operation 302 as described in FIG. 3A, for example, by utilizing the modified integrity key, IK$\oplus$KM. In step 348, the authentication code may be generated based on the leftmost 32 bits of the modified current value of the processing variable B generated in step 346. After step 348, the flow diagram 320 may proceed to end step 350.

Figure 4A:
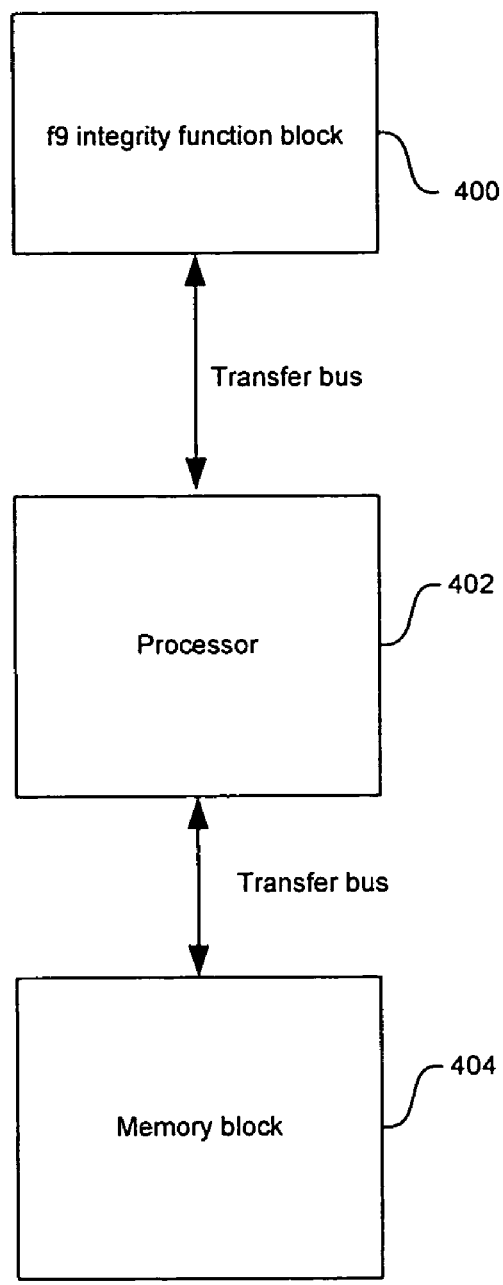
FIG. 4A is a block diagram of an exemplary system for generating and utilizing the f9 integrity function, in accordance with an embodiment of the invention.

FIG. 4A is a block diagram of an exemplary system for generating and utilizing the f9 integrity function, in accordance with an embodiment of the invention. Referring to FIG. 4A, there is shown an f9 integrity function block 400, a processor 402, and a memory 404. The f9 integrity function block 400 may comprise suitable logic, circuitry, and/or code that may be adapted to perform the f9 integrity function. The processor 402 may comprise suitable logic, circuitry, and/or code that may be adapted to transfer control signals and/or data to the f9 integrity function block 400. The processor 402 may be adapted to receive control signals and/or processed data from the f9 integrity function block 400. Communication between the processor 402 and the f9 integrity function block 400 may be performed via a transfer bus, for example. In this regard, the f9 integrity function block 400 may operate as a peripheral device to the processor 402, for example. The memory block 404 may comprise suitable logic, circuitry, and/or code that may be adapted to store control data that may be utilized and/or that may have been processed by the f9 integrity function block 400. Communication between the processor 402 and the memory block 404 may be performed via a transfer bus, for example.

Figure 4B:
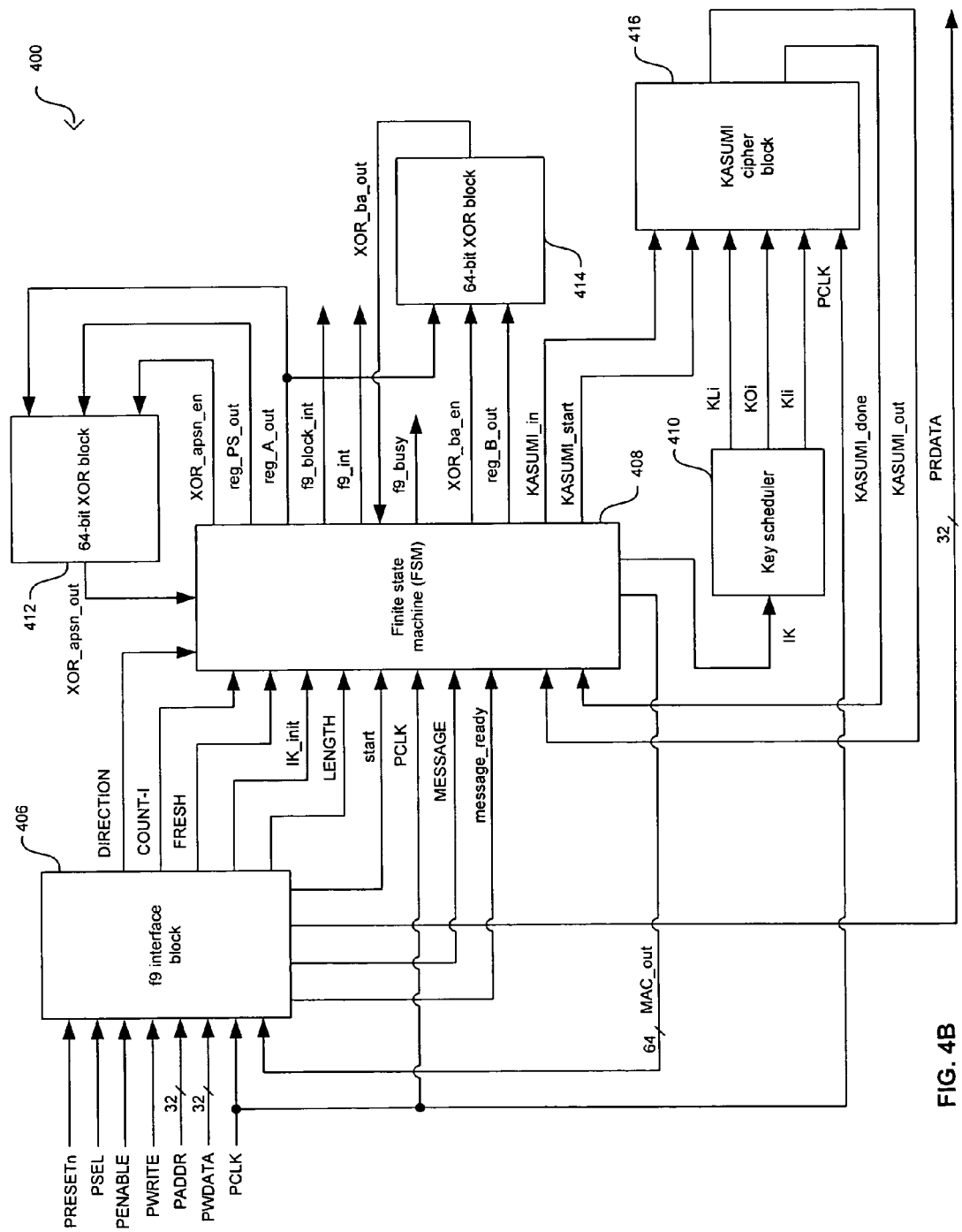
FIG. 4B is a block diagram of an exemplary implementation of the f9 integrity function block, in accordance with an embodiment of the invention.

FIG. 4B is a block diagram of an exemplary implementation of the f9 integrity function block, in accordance with an embodiment of the invention. Referring to FIG. 4B, the f9 integrity function block 400 may comprise an f9 interface block 406, a finite state machine (FSM) 408, a key scheduler 410, a first 64-bit XOR block 412, a second 64-bit XOR block 414, and a KASUMI cipher block 416. The f9 interface block 406 may comprise suitable logic, circuitry, and/or code that may be adapted receive a plurality of data and control signals and to generate at least a portion of the input variables to the f9 integrity function based on the received data and control signals. The FSM 408 may comprise suitable logic, circuitry, and/or code that may be adapted to control the operation and data processing flow of the f9 integrity function block 400.

The FSM 408 may receive a plurality of input signals and may generate a plurality of output signals in order to perform the operation control and/or the data processing flow control of the f9 integrity function block 400. The FSM 408 may be configured and/or adapted to accommodate modifications and/or changes in the specifications of the f9 integrity function for WCDMA applications.

The key scheduler 410 may comprise suitable logic, circuitry, and/or code that may be adapted to generate a set of subkeys KLi, KOi, and KIi from the integrity key IK, where the set of subkeys may be utilized in the KASUMI algorithm of the KASUMI operation 302 in FIGS. 3A and i is an index that corresponds to the current round of processing in the eight-round KASUMI algorithm. The key scheduler 410 may be adapted to generate at least a portion of the set of subkeys before the start of the KASUMI operation.

The first 64-bit XOR 412 may comprise suitable logic, circuitry, and/or code that may be adapted to perform a bit-wise XOR operation. In this regard, the first 64-bit XOR 412 may correspond to an XOR operation 304 in FIG. 3A that may be utilized to generate the current processing input to a KASUMI operation 302. The second 64-bit XOR 412 may comprise suitable logic, circuitry, and/or code that may be adapted to perform a bit-wise XOR operation. In this regard, the second 64-bit XOR 412 may correspond to an XOR operation 304 in FIG. 3A that may be utilized to generate current value of the processing variable B. The KASUMI cipher block 416 may comprise suitable logic, circuitry, and/ or code that may be adapted to perform the KASUMI algorithm. A portion of the operation of the KASUMI cipher block 412 may correspond to that of at least one KASUMI operation 302 in FIG. 3A.

In operation, the f9 interface block 406 may receive a plurality of input signals. For example, the f9 interface block 406 may receive a preset signal, PRESETn, a system clock signal, PCLK, a select signal, PSEL, an enable signal, PENABLE, a write signal, PWRITE. The preset signal may be utilized to reset at least a portion of the values generated by the f9 interface block 406. In this regard, the reset may occur on an active low preset signal, for example. The clock signal may be utilized to synchronize the operations of the f9 interface block 406 and the operations of other components of the f9 integrity function block 400. The select signal may be utilized to select the f9 integrity function block 400. In this regard, the f9 integrity function block 400 may be selected as a peripheral or slave device to the processor 402 in FIG. 4A, for example. The enable signal may be utilized as a peripheral strobe signal that may time accesses on a peripheral bus, for example. The write signal may be utilized to provide read and write access to the f9 interface block 406. For example, write access may be provided when the write signal is active high and read access may be provided when the write signal is active low.

The f9 interface block 406 may also be adapted to receive address information from an address bus, PADDR, and data information from a write data bus, PWDATA. The write data bus may a 32-bit bus and may be driven or written to when the write signal is active high, for example. The f9 interface block 406 may also be adapted to transfer data information to a read data bus, PRDATA. The read data bus may be a 32-bit bus and may be driven or written to when the write signal is active low, for example. The f9 interface block 406 may receive, via the write data bus for example, the contents of the input variables COUNT-I, FRESH, DIRECTION, MESSAGE, and IK. The contents of the input variables may be stored in the f9 interface block 406 in a plurality of registers, for example.

The f9 interface block 406 may also be adapted to generate a plurality of signals that may be transferred to the FSM 408. For example, the f9 interface block 406 may generate input variable signals, DIRECTION, COUNT, FRESH, LENGTH, MESSAGE, and IK_init, which may correspond to at least a portion of the input variables to the f9 integrity function block 400. The f9 interface block 406 may also generate a start signal that may be utilized to initiate the operations of the FSM 408 and a ready signal, message_ready, that may be utilized to indicate to the FSM 408 when a next portion of the input bit stream, for example, a next processing block of input bits, may be available for processing.

The FSM 408 may be adapted to generate processing inputs for a current processing stage by enabling via an enable signal, XOR_apsn_en, the operation of the first 64-bit XOR block 412. The first 64-bit XOR block 412 may be adapted to XOR the immediately generated previous value of the processing variable A, represented by a register signal, reg_A, with the current processing block of bits represented by a register signal, reg_PS. The output of the first 64-bit XOR block 412 may correspond to the processing input to a KASUMI operation and may be represented by an output signal, XOR_apsn_out.

The FSM 408 may also be adapted to generate a current value of the processing variable B by enabling via an enable signal, XOR_ba_en, the operation of the second 64-bit XOR block 414. The second 64-bit XOR block 414 may be adapted to XOR the immediately generated previous value of the processing variable B, represented by a register signal reg_B, with the current value of the processing variable A represented by the register signal, reg_A. The output of the second 64-bit XOR block 414 may correspond to the current value of the processing variable B and may be represented by an output signal, XOR_ba_out.

The FSM 408 may also be adapted to generate a busy signal, f9_busy, which may be utilized to indicate that the f9 integrity function block 400 may be in operation. Moreover, the FSM 408 may be adapted to generate a partial interrupt signal, f9_block_int, which may be utilized to indicate when a 64-bit block has been processed and a full interrupt signal, f9_int, which may be utilized to indicate when the message authentication code process has been completed.

The key scheduler 410 may be adapted to generate a plurality of subkeys based on a key value provided by the FSM 408. In some instances, the subkeys may be based on the integrity key, IK, or on the modified integrity key, IK⊕KM. The key scheduler 410 may be adapted to transfer the generated subkeys via signals, KLi, KOi, and/or KIi, where i is an index that corresponds to a current round of processing in the KASUMI cipher block 416.

The KASUMI cipher block 416 may be adapted to process current processing inputs based on the integrity key, IK, during each processing stage of the f9 integrity function and also to process a last value of the processing variable B to be modified based on the modified integrity key, IK⊕KM. A start signal, KASUMI_start, may be generated by the FSM 408 to initiate the operations of the KASUMI cipher block 416. An input signal, KASUMI_in, may represent the input to the KASUMI cipher block 416. A completion signal, KASUMI_done, and an output signal, KASUMI_out, may be generated by the KASUMI cipher block 416 to indicate the completion of the KASUMI algorithm and the results of the KASUMI algorithm respectively.

When the KASUMI cipher block 416 generates a message authentication code, MAC-I or XMAC-I, by modifying the last value of the processing variable B, the message authentication code may be stored in the FSM 408 and may be transferred from the FSM 408 to the f9 interface block 406 via an output signal, MAC_out. The f9 interface block 406 may transfer the message authentication code to other processing components via the read data bus, PRDATA.

Figure 4C:
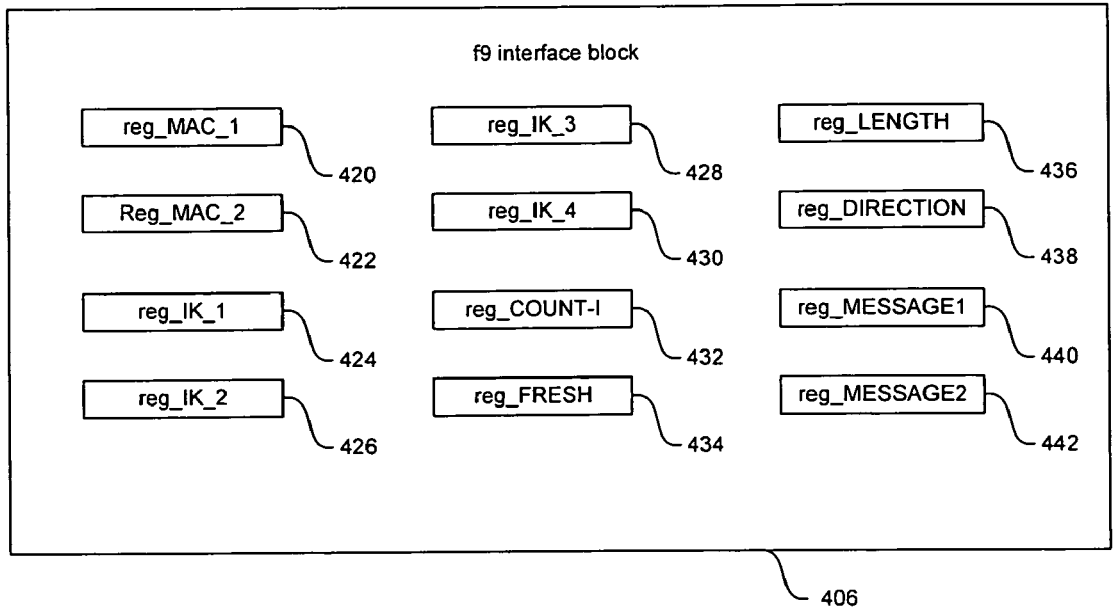
FIG. 4C is a block diagram of an exemplary implementation of the f9 interface block utilized in the f9 integrity function block, in accordance with an embodiment of the invention.

FIG. 4C is a block diagram of an exemplary implementation of the f9 interface block utilized in the f9 integrity function block, in accordance with an embodiment of the invention. Referring to FIG. 4C, the f9 interface block 406 in FIG. 4B may comprise a first message authorization code register (reg_MAC_1) 420, a second message authorization code register (reg_MAC_2) 422, a first integrity key register (reg_IK_1) 424, a second integrity key register (reg_IK_2) 426, a third integrity key register (reg_IK_3) 428, a fourth integrity key register (reg_IK_4) 430, a frame dependent input register (reg_COUNT-I) 432, a random value register (reg_FRESH) 434, an input stream length register (reg_LENGTH) 436, a direction of transmission register (reg_DIRECTION) 438, a first input stream register (reg_MESSAGE1) 440, and a second input stream register (reg_MESSAGE2) 442.

The reg_MAC_1 420 and the reg_MAC_2 422 may comprise suitable logic, circuitry, and/or code that may be adapted to store a first portion and a remaining portion of the modified last value of the processing variable B respectively. For example, the reg_MAC_1 420 and the reg_MAC_2 422 may be implemented as 32-bit registers where the reg_MAC_1 420 may store the 32 LSBs of the modified last value of the processing variable B while the reg_MAC_2 422 may store the 32 MSBs of the modified last value of the processing variable B. In that regard, the contents of the reg_MAC_1 420 may be read via the read data bus, PRDATA, to obtain the message authentication code from the f9 integrity function block 400.

The reg_IK_1 424, the reg_IK_2 426, the reg_IK_3 428, and the reg_IK_4 430 may comprise suitable logic, circuitry, and/or code that may be adapted to store at least a portion of the integrity key, IK. The integrity key, IK, may be received via the write data bus, PWDATA, and portions of the received integrity key may be stored in the reg_IK_1 424, the reg_IK_2 426, the reg_IK_3 428, or the reg_IK_4 430 in accordance with address information that may be provided by the address bus, PADDR. For example, the reg_IK_1 424, the reg_IK_2 426, the reg_IK_3 428, and the reg_IK_4 430 may be implemented as 32-bit registers in order to store the 128-bit integrity key, IK.

The reg_COUNT-1 432 may comprise suitable logic, circuitry, and/or code that may be adapted to store the frame dependent input, COUNT-I. The frame dependent input, COUNT-I, may be received via the write data bus, PWDATA, and may be stored in the reg_COUNT-1 432 in accordance with address information that may be provided by the address bus, PADDR. For example, the reg_COUNT-I 432 may be implemented as a 32-bit register in order to store the 32-bit frame dependent input, COUNT-I.

The reg_FRESH 434 may comprise suitable logic, circuitry, and/or code that may be adapted to store the random number, FRESH. The random number, FRESH, may be received via the write data bus, PWDATA, and may be stored in the reg_FRESH 434 in accordance with address information that may be provided by the address bus, PADDR. For example, the reg_FRESH 434 may be implemented as a 32-bit register in order to store the 32-bit random number, FRESH.

The reg_LENGTH 436 may comprise suitable logic, circuitry, and/or code that may be adapted to store the length of the message to be authenticated. The length of the message to be authenticated, LENGTH, may be received via the write data bus, PWDATA, and may be stored in the reg_LENGTH 436 in accordance with address information that may be provided by the address bus, PADDR. For example, the reg_LENGTH 436 may be implemented as a 16-bit register in order to store up to 216 possible length values for the message to be authenticated.

The reg_DIRECTION 438 may comprise suitable logic, circuitry, and/or code that may be adapted to store the direction of transmission bit, DIRECTION, and a start bit that may be utilized to indicate to the FSM 408 to start processing. The direction of transmission bit, DIRECTION, may be received via the write data bus, PWDATA, and may be stored in the reg_DIRECTION 438 in accordance with address information that may be provided by the address bus, PADDR. For example, the reg_DIRECTION 438 may be implemented as a 16-bit register where the direction of transmission bit, DIRECTION, may be stored in the least significant bit in the register while the start bit may be stored in the most significant bit of the register.

The reg_MESSAGE1 440 and the reg_MESSAGE2 442 may comprise suitable logic, circuitry, and/or code that may be adapted to store a portion of the input bit stream, MESSAGE. The input bit stream, MESSAGE, may be received via the write data bus, PWDATA, and portions may be stored in the reg_MESSAGE1 440 and the reg_MESSAGE2 442 in accordance with address information that may be provided by the address bus, PADDR. For example, the reg_MESSAGE1 440 and the reg_MESSAGE2 442 may be implemented as 32-bit registers so that up to 64 bits of the input bit stream may be stored in the f9 interface block 406 at a time. In this regard, the f9 interface block 406 may generate a signal, message_ready, which may be utilized to indicate to the FSM 408 that 64 bits of the input bit stream, MESSAGE, are ready for processing. Once the current 64 bits in the reg_MESSAGE1 440 and the reg_MESSAGE2 442 are transferred to the FSM 406, additional bits in the input bit stream, MESSAGE, may be stored in the reg_MESSAGE1 440 and the reg_MESSAGE2 442. When the final processing block of bits in the input bit stream, MESSAGE, is fewer than 64 bits, the contents of the reg_MESSAGE1 440 and the reg_MESSAGE2 442 may be transferred to the FSM 406 where the direction of transmission bit, DIRECTION, and an appropriate number of logic 0 bits may be concatenated to the transferred contents in order to generate a processing block of bits that comprises 64 bits.

Figure 4D:
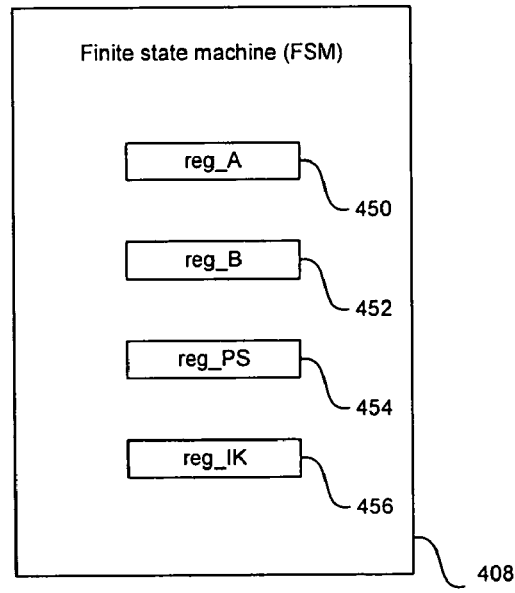
FIG. 4D is a block diagram of an exemplary implementation of the finite state machine utilized in the f9 integrity function block, in accordance with an embodiment of the invention.

FIG. 4D is a block diagram of an exemplary implementation of the finite state machine utilized in the f9 integrity function block, in accordance with an embodiment of the invention. Referring to FIG. 4D, the FSM 408 may comprise a processing variable A register (reg_A) 450, a processing variable B register (reg_B) 452, a current processing blocks of bits register (reg_PS) 454, and an integrity key register (reg_IK) 456. The reg_A 450 may comprise suitable logic, circuitry, and/or code that may be adapted to store the value of the processing variable A. For example, reg_A 450 may store the initialized value of the processing variable A until a new value is generated during the first processing stage. For any additional processing stage, the reg_A 450 may contain the value of the processing variable A generated or determined in the immediately previous processing stage until a current value for the processing variable A is determined and stored in the reg_A 450 during the current processing stage. The reg_A 450 may be implemented as a 64-bit register, for example.

The reg_B 452 may comprise suitable logic, circuitry, and/or code that may be adapted to store the value of the processing variable B. For example, reg_B 452 may store the initialized value of the processing variable B until a new value is generated during the first processing stage. For any additional processing stage, the reg_B 452 may contain the value of the processing variable B generated or determined in the immediately previous processing stage until a current value for the processing variable B is determined and stored in the reg_B 450 during the current processing stage. The reg_B 452 may be implemented as a 64-bit register, for example.

The reg_PS 454 may comprise suitable logic, circuitry, and/or code that may be adapted to store the current processing block of bits represented by the parameter PSn. For example, for each processing stage n, the FSM 408 may transfer the portion of the padded string, PS, which corresponds to the current processing block of bits to the reg_PS 454. The reg_PS 454 may be implemented as a 64-bit register, for example. The reg_IK 456 may comprise suitable logic, circuitry, and/or code that may be adapted to store the 128-bit integrity key, IK.

Figure 5:
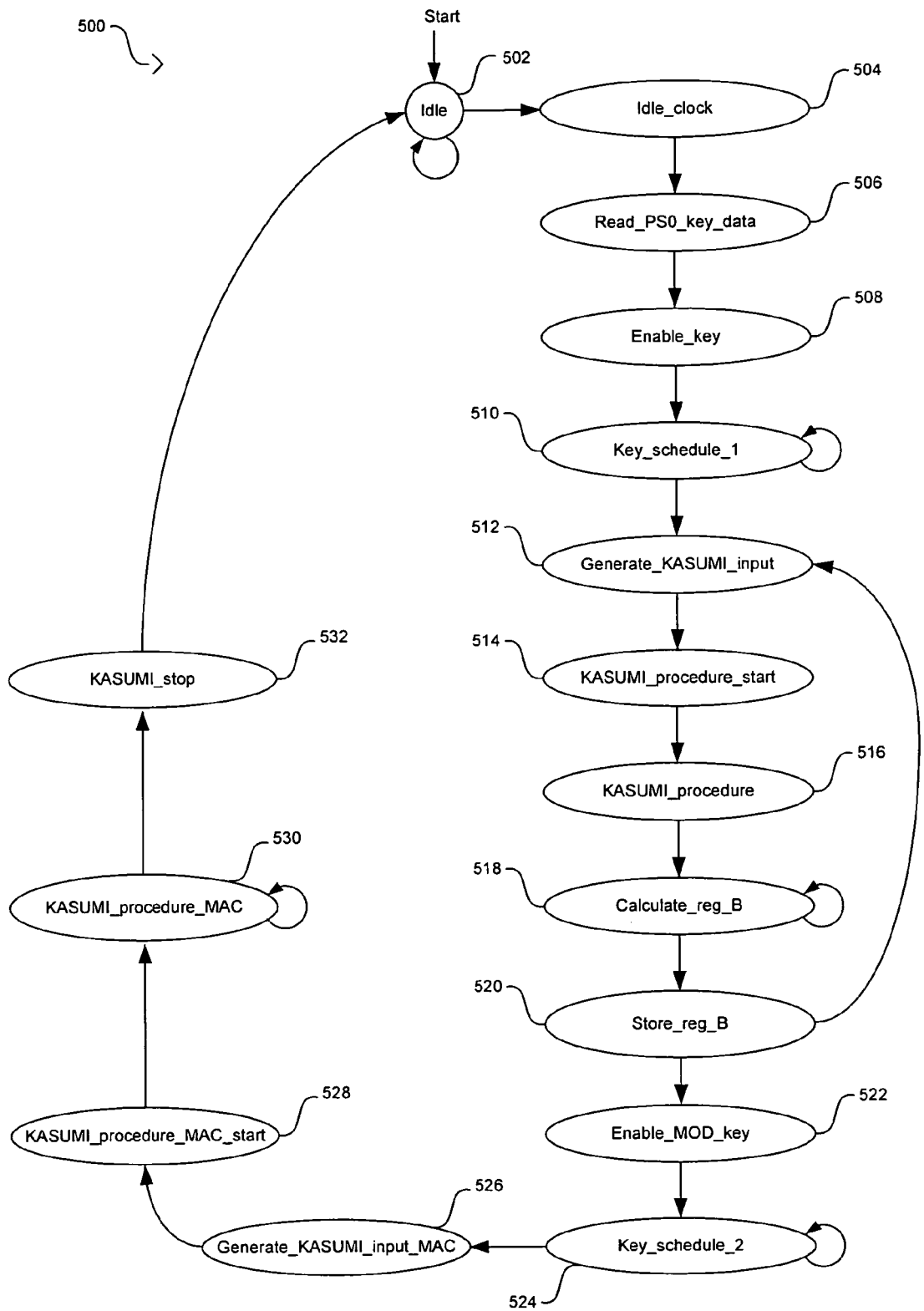
FIG. 5 is an exemplary state diagram illustrating the operation of the finite state machine in the f9 integrity function block, in accordance with an embodiment of the invention.

FIG. 5 is an exemplary state diagram illustrating the operation of the finite state machine in the f9 integrity function block, in accordance with an embodiment of the invention. Referring to FIG. 5, the FSM 408 may remain in an idle state 502 until a start signal is received from the f9 interface block 406. The idle state 502 may be a default state for the FSM 408. During the idle state 502, the reg_A 450 and the reg_B 452 in the FSM 408 as shown in FIG. 4D may be initialized to zero. The start signal received in idle state 502 may be an asynchronous signal and may need to be synchronized to the system clock signal, PCLK. Once the start signal is received, the FSM 408 may proceed to an idle_clock state 504, where the internal clocks in the FSM 408 may be powered up after being powered down previously to conserve energy while the f9 integrity function block 400 was not in use. The FSM 408 may remain in the idle_clock state 504 for one clock cycle, for example. The idle_clock state 504 may be utilized to reduce timing problems when, for example, the system clock signal, PCLK, is replaced by a gated clock signal internal to the f9 integrity function block 400. Once the internal clocks have been powered up, the start signal may be synchronized and the FSM 408 may proceed to a read_PS0_key_data state 506, where a control signal, ps0_key_en may be set. This signal may be utilized in the FSM 408 to ensure that the integrity key, IK, is transferred from the f9 interface block 406 to the FSM 408. The first processing block of bits represented by $PS_0$ may be stored in the local register reg_PS 454 in the FSM 408. The control signal, ps0_key_en, may be active for one clock cycle, for example.

After completing the read_ps0_key_data state 506, the FSM 408 may proceed to an enable_key state 508, where the integrity key, IK, is stored in the local register reg_IK 456 in the FSM 408. After the enable_key state 508, the FSM 408 may proceed to a key_schedule_1 state 510, where the combinational logic in the key scheduler 410 may generate all the subkeys that may be utilized by the KASUMI algorithm when utilizing the unmodified integrity key, IK. In some instances, the FSM 408 may require the key scheduler 410 to generate and transfer the subkeys to the KASUMI cipher block 416 before a KASUMI operation begins. The FSM 408 may remain in the key_schedule_1 state 510 for two clock cycles, for example. After the key_schedule_1 state 510 is completed, the FSM 408 may proceed to a generate_KASUMI_input state 512, where the FSM 408 may generate the signal XOR_apsn_en to initiate the XORing of the contents in the reg_A 450 and the contents in the reg_PS 454 by the first 64-bit XOR block 412. The output of the first 64-bit XOR block 412 is the signal XOR_apsn_out that corresponds to the current processing input to a KASUMI operation.

Following the completion of the generate_KASUMI_input state 512, the FSM 408 may proceed to a KASUMI_procedure_start state 514, where the FSM 408 may generate the signal KASUMI_start, which may be utilized to indicate to the KASUMI cipher block 416 to start the KASUMI operation. After completing the KASUMI_procedure_start state 514, the FSM 408 may proceed to a KASUMI_procedure state 516, where the KASUMI cipher block 416 may perform the KASUMI algorithm on the current processing input generated in the generate_KASUMI_input state 512. The current processing input may be transferred to the KASUMI cipher block 416 via the signal KASUMI_in. When the KASUMI operation is completed, the KASUMI cipher block 416 may generate the signal KASUMI_done. On the assertion of the signal KASUMI_done, the output of the KASUMI cipher block 416, KASUMI_out, which corresponds to a current value of the processing variable A, may be stored in the reg_A 450 in the FSM 408. The KASUMI algorithm or KASUMI operation performed by the KASUMI cipher block 416 may take, for example, 56 clock cycles for completion. During the KASUMI algorithm processing period, a new 64-bit processing block of bits may be sent from the f9 interface block 406 to the reg_PS 454 when the FSM 408 has received the signal message_ready.

Following the completion of the KASUMI_procedure state 516, the FSM 408 may proceed to the calculate_reg_B state 518, where the FSM 408 may generate the signal XOR_ba_en to initiate the XORing of the contents in the reg_A 450 and the contents in the reg_B 452 by the second 64-bit XOR block 414. The output of the second 64-bit XOR block 414 is the signal XOR_ba_out that corresponds to the current value of the processing variable B. After completing the calculate_reg_B state 518, the FSM 408 may proceed to a store_reg_B state 520, where the current value of the processing variable B may be stored in the reg_B 452 in the FSM 408. The number of processing blocks of bits that remain to be processed in order to determine the message authentication code may be determined. When additional processing blocks of bits remain to be processed, the FSM 408 may return to the generate_KASUMI_input state 512. When additional processing blocks of bits may not need to be processed, the FSM 408 may proceed to an enable_MOD_key state 522, where the integrity key, IK, may be modified by a key modifier, KM, to generate a modified integrity key, IK⊕KM.

The FSM 408 may proceed to a key_schedule_2 state 524 after completing the enable_MOD_key state 522. In the key_schedule_2 state 524 the combinational logic in the key scheduler 410 may generate all the subkeys that may be utilized by the KASUMI algorithm when utilizing the modified integrity key, IK⊕KM. In some instances, the FSM 408 may require the key scheduler 410 to generate and transfer the subkeys to the KASUMI cipher block 416 before a KASUMI operation begins. The FSM 408 may remain in the key_schedule_2 state 524 for two clock cycles, for example. After the key_schedule_2 state 524 is completed, the FSM 408 may proceed to a generate_KASUM_input_MAC state 526, where the contents of the reg_B 452 may be transferred to the KASUMI cipher block 416 for processing.

After completing the generate_KASUM_input_MAC state 526, the FSM 408 may proceed to a KASUMI_procedure_start_MAC state 528, where the FSM 408 may generate the signal KASUMI_start to indicate to the KASUMI cipher block 416 to start the KASUMI operation on the modified last value of the processing variable B stored in the reg_B 452. Following the completion of the KASUMI_procedure_start_MAC state 528, the FSM 408 may proceed to a KASUMI_procedure_MAC state 530, where the KASUMI cipher block 416 may perform the KASUMI algorithm on the contents stored in the reg_B 452. The contents of the reg_B 452 may be transferred to the KASUMI cipher block 416 via the signal KASUMI_in. After completing the KASUMI_procedure_MAC state 530, the FSM 408 may proceed to a KASUMI_stop state 532, where the KASUMI cipher block 416 may generate the signal KASUMI_done upon completion of the KASUMI algorithm processing. On the assertion of the signal KASUMI_done, the output of the KASUMI cipher block 416, KASUMI_out, corresponds to a message authentication code. The 64-bit message authentication code may be transferred from the FSM 408 to the f9 interface block 406 via the signal MAC_out. Following the completion of the KASUMI_stop state 532, the FSM 408 may return to the idle state 502.

Another embodiment of the invention may provide a machine-readable storage, having stored thereon, a computer program having at least one code section executable by a machine, thereby causing the machine to perform the steps as described above for implementing an f9 integrity algorithm in WCDMA compliant handsets.

The approach described herein may provide a cost effective IC solution capable of accelerating the generation of a message authentication code for data integrity that may facilitate a faster deployment of next generation data services.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for implementing the f9 integrity algorithm, the method comprising:
performing by one or more processors and/or circuits:
generating a first processing block of bits and at least one additional processing block of bits;
generating at least one signal to indicate when generation of a first processing value and a second processing value from said first processing block of bits is completed;
generating at least one signal to indicate when generation of at least one additional first processing value and at least one additional second processing value from said at least one additional processing block of bits is completed; and
after at least one signal is generated to indicate when generation of a last of said at least one additional second processing value is completed, generating an authentication code based on said last of said at least one additional second processing value and on a modified integrity key.

2. The method according to claim 1, wherein said generating at least one signal to indicate when generation of at least one additional first processing value and at least one additional second processing value is completed, utilizes an immediately generated previous first processing value and an immediately generated previous second processing value respectively.

3. The method according to claim 2, comprising pipelining transfer of said immediately generated previous first processing value from a previous processing stage to a current processing stage.

4. The method according to claim 2, comprising pipelining transfer of said immediately generated previous second processing value from a previous processing stage to a current processing stage.

5. The method according to claim 2, comprising generating a processing input by XORing said immediately generated previous first processing value with said corresponding processing block of bits after at least one signal is generated to enable said XORing.

6. The method according to claim 5, comprising generating said at least one additional first processing value by performing a KASUMI operation on said generated processing input with an integrity key after at least one signal is generated to indicate that said KASUMI operation is to begin.

7. The method according to claim 6, comprising generating said at least one additional second processing value by XORing said generated at least one additional first processing value with an immediately generated previous second processing value after at least one signal is generated to enable said XORing.

8. The method according to claim 1, comprising generating a last of said at least one additional second processing value by XORing a last of said at least one additional first processing value with an immediately generated previous second processing value after at least one signal is generated to enable said XORing.

9. The method according to claim 1, comprising selecting a portion of said generated authentication code.

10. The method according to claim 1, comprising storing said first processing value and said at least one additional first processing value.

11. The method according to claim 1, comprising storing said second processing value and said at least one additional second processing value.

12. The method according to claim 1, wherein said generating of said first processing block of bits and said at least one additional processing block of bits is based on a padded string generated from a plurality of input values.

13. A system for implementing the f9 integrity algorithm, the system comprising:
one or more circuits that are operable to generate a first processing block of bits and at least one additional processing block of bits;
said one or more circuits are operable to generate at least one signal to indicate when generation of a first processing value and a second processing value from said first processing block of bits is completed;
said one or more circuits are operable to generate at least one signal to indicate when generation of at least one additional first processing value and at least one additional second processing value from said at least one additional processing block of bits is completed; and
said one or more circuits are operable to generate, after at least one signal is generated to indicate when generation of a last of said at least one additional second processing value is completed, an authentication code based on said last of said at least one additional second processing value and on a modified integrity key.

14. The system according to claim 13, wherein said generating at least one signal to indicate when generation of at least one additional first processing value and at least one additional second processing value is completed, utilizes an immediately generated previous first processing value and an immediately generated previous second processing value respectively.

15. The system according to claim 14, wherein said one more circuits are operable to pipeline transfer said immediately generated previous first processing value from a previous processing stage to a current processing stage.

16. The system according to claim 14, wherein said one more circuits are operable to pipeline transfer said immediately generated previous second processing value from a previous processing stage to a current processing stage.

17. The system according to claim 14, wherein said one more circuits are operable to generate a processing input by XORing said immediately generated previous first processing value with said corresponding processing block of bits after at least one signal is generated to enable said XORing.

18. The system according to claim 17, wherein said one more circuits are operable to generate said at least one additional first processing value by performing a KASUMI operation on said generated processing input with an integrity key after at least one signal is generated to indicate that said KASUMI operation is to begin.

19. The system according to claim 18, wherein said one more circuits are operable to generate said at least one additional second processing value by XORing said generated at least one additional first processing value with an immediately generated previous second processing value after at least one signal is generated to enable said XORing.

20. The system according to claim 13, wherein said one more circuits are operable to generate a last of said at least one additional second processing value by XORing a last of said at least one additional first processing value with an immediately generated previous second processing value after at least one signal is generated to enable said XORing.

21. The system according to claim 13, wherein said one more circuits are operable to select a portion of said generated authentication code.

22. The system according to claim 13, wherein said one more circuits are operable to store said first processing value and said at least one additional first processing value.

23. The system according to claim 13, wherein said one more circuits are operable to store said second processing value and said at least one additional second processing value.

24. The system according to claim 13, wherein said one or more circuits are operable generate said first processing block of bits and said at least one additional processing block of bits based on a padded string generated from a plurality of input values.

* * * * *